United States Patent
Hasanen

(10) Patent No.: US 9,277,733 B2
(45) Date of Patent: Mar. 8, 2016

(54) DEVICE FOR INCREASING THE TRAINING EFFECT IN A HORSE

(75) Inventor: Pertti Hasanen, Portsmouth, NH (US)

(73) Assignee: MP Innovations Oy (FI)

( * ) Notice: Subject to any disclaimer, the term of this patent is extended or adjusted under 35 U.S.C. 154(b) by 0 days.

(21) Appl. No.: 13/876,526

(22) PCT Filed: Sep. 26, 2011

(86) PCT No.: PCT/FI2011/050830
§ 371 (c)(1),
(2), (4) Date: Mar. 28, 2013

(87) PCT Pub. No.: WO2012/042109
PCT Pub. Date: Apr. 5, 2012

(65) Prior Publication Data
US 2013/0192179 A1    Aug. 1, 2013

(30) Foreign Application Priority Data
Sep. 28, 2010 (FI) ..................... 20105996

(51) Int. Cl.
*B68C 1/12* (2006.01)
*A01K 15/02* (2006.01)
*A01K 13/00* (2006.01)

(52) U.S. Cl.
CPC ............... *A01K 15/02* (2013.01); *A01K 13/008* (2013.01); *B68C 1/12* (2013.01)

(58) Field of Classification Search
CPC ........ A01K 13/008; A01K 15/02; B68C 1/12; B68C 1/04; B68C 5/00; B68C 2005/005
USPC ................. 54/66, 65, 71, 79.4, 79.1
See application file for complete search history.

(56) References Cited

U.S. PATENT DOCUMENTS

| 40,128 | A | * | 9/1863 | Spencer | 54/66 |
| 134,921 | A | * | 1/1873 | Morris | 54/79.1 |
| 160,012 | A | * | 2/1875 | Franke | 54/79.1 |
| 179,265 | A | * | 6/1876 | Carrick | 54/66 |
| 314,821 | A | * | 3/1885 | Pointeine | 54/65 |
| 362,431 | A | * | 5/1887 | Cusson | 54/65 |
| 4,974,398 | A | | 12/1990 | Kaski | |
| 5,127,213 | A | | 7/1992 | Petronio | |
| 5,375,397 | A | * | 12/1994 | Ferrand et al. | 54/66 |
| 6,421,989 | B1 | * | 7/2002 | Leson | 54/66 |
| 6,634,160 | B1 | | 10/2003 | Brauckmann-Towns | |
| 7,721,514 | B1 | | 5/2010 | Pierce et al. | |
| 2004/0099221 | A1 | | 5/2004 | Everett | |
| 2010/0146914 | A1 | * | 6/2010 | MacDonald | 54/79.1 |
| 2011/0078984 | A1 | * | 4/2011 | Gonzales | 54/66 |

FOREIGN PATENT DOCUMENTS

DE 202005017909 U 2/2006
WO WO2006037838 4/2006

* cited by examiner

*Primary Examiner* — Monica Williams
*Assistant Examiner* — Magdalena Topolski
(74) *Attorney, Agent, or Firm* — Skinner and Associates; Joel D. Skinner

(57) ABSTRACT

Device for increasing the training effect in a horse, consisting of essentially a sheet of mat-like material (1) adapting to and attachable to the horse's back. The mat-like sheet (1) is, over a substantial area, equipped with slits (9) going through the mat, in order to improve flexibility, and also of cuts (3, 4) that take up a position in essentially the area of the highest point of the horse's rear scapulae, which permits the overlapping of the parts of the mat remaining on different sides of the cut (3, 4).

4 Claims, 2 Drawing Sheets

DEVICE FOR INCREASING THE TRAINING EFFECT IN A HORSE

The present invention relates to a device for increasing the training effect in a horse. The matter concerns particularly, though not solely, the training of a trotting-horse.

In terms of sport, horses are used for many different purposes, there are riding horses, horses used for various sports involving skill, but trotting-horses form a very large proportion.

It is obvious that, in order to succeed well, a horse must be well trained in terms of physical condition. Thus, instead of only running, trotting trainers use a variety of appliances and procedures for training horses. One way is to make the horse run in shallow water, though there is quite seldom a suitable place for this and the said procedure is also suspect for environmental reasons.

Attempts are made to make the training programme more physically demanding, for example by making the horse pull a load causing a large tractive resistance. For this purpose, some trainers use the pulling of a sleigh in summer. However, this alters the running attitude of the horse, and thus its co-ordination and muscular equilibrium.

Simply increasing muscle power is not necessarily the best possible way to train a trotting-horse, the main purpose of which is, however, to run quickly. Thus, running is of very great significance in training.

The present invention is intended to create a device, which is used precisely for running training, especially with trotting-horses. The intention is to create a device, which is simple in construction and is easy to use. The intention is also to create a device, which permits a horse to run normally with an additional load, and will thus not alter the horse's co-ordination or muscular equilibrium.

The aforementioned and other advantages and benefits or the present invention are achieved in the manner described as characteristic in the accompanying claims.

Figure 1:
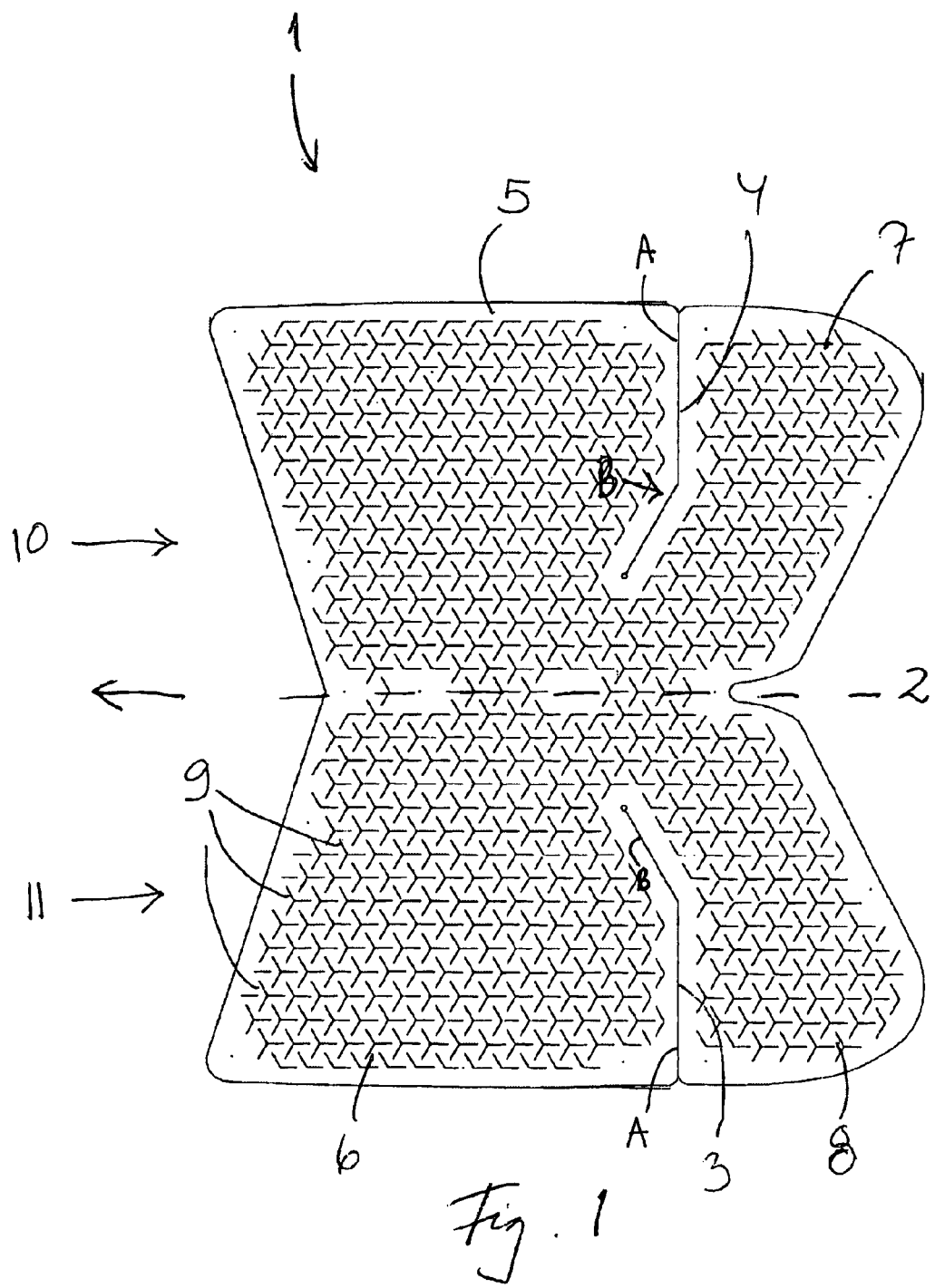
Figure 2:

In the following, the invention is described in greater detail with reference to the accompanying schematic figures, which show one well-regarded embodiment of the invention. Thus;

FIG. 1 shows a spread-out view of one embodiment of the device according to the invention; and FIG. 2 illustrates the device according to the invention, when placed on a horse's back.

The device 1 is an item manufactured from an essentially sheet-like material. The device is intended to be placed on a horse's back, prior to the start of training. The direction is shown by an arrow, i.e. the arrow points towards the horse's head. All the attachment means, which naturally form part of the device according to the invention, the means for attaching to the harness or to other existing parts, or to support them, have been omitted from the figure.

Thus, the device 1 is placed on the horse's back, in such a way that it is positioned, essentially folded around its centre line 2, on both flanks of the horse. FIG. 2 shows a side view of how the device is positioned on the horse's back.

The device is manufactured from a material that is sufficiently heavy, in the form of a mat of the thickness used, to give the horse a sufficient additional load for training. One material, which has been used, is so-called hard rubber, the specific weight of which is in the order of 1-2 tonnes per cubic meter. The device is manufactured from a mat, the thickness of which provides a sufficient load. By way of example, it can be said that a mat thickness of about 6 mm will give more or less the correct weight. It is often stated that the load should be about 2-5% of the horse's weight. Many other materials that can replace hard rubber can be found on the market.

A cushioning layer, which can be a separate blanket or similar, or also a layer laminated or otherwise attached to the surface of the device, can be used between the device 1 and the horse's back.

As is known, a horse's back is certainly not a flat, horizontal surface, but has a line that rises at least slightly from behind the front scapulae towards the rear scapulae and after that forms a descending line. In order to compensate for this rise and fall, the device according to the invention has left and right sides 10 and 11 divided by the centerline 2. Cuts 3 and 4 made in the mat 1 divide each side 10 and 11 thereof into anterior or front parts 5 and 6 and posterior or rear parts 7 and 8. The cuts 3 and 4 permit the parts 5,7 and 6,8 on each side 10 and 11 to overlap, so that the device 1 adapts to the shape of the horse's back. The overlapping is shown by the broken line 12 in FIG. 2 of the right side (as viewed from the front of a horse) of the horse 13, with the anterior part 6 being disposed over the posterior part 8. As shown, the slits 3 and 4 are particularly bent or curved, in order to ensure overlapping. Each slit 3 and 4 has exterior second part A that extends laterally inward from the edge or periphery of the mat 1, interiorly, and a interior first part B that is angled anteriorly or towards the front of the mat 1.

A very important aspect of the adaptation of the device according to the invention into place on the horse's back is that nearly the whole device is made to be adaptable by making slits 9 in it, which in an effective manner provide a flexible but nevertheless strong structure, which adapts to a horse's back like a glove to a hand. One type of slit that has been proven to be good is a crowfoot cut like that shown.

As stated earlier, the attachment belts or similar, with the aid of which the device is attached to the horse's back, are also an essential part of the device according to the invention. The front part of the device includes belts, with the aid of which the device is attached to the reins, belts can be attached to the sides of the device for securing, for instance, under the horse's belly, and at the rear part of the device there can be belts for attachment to the horse's tail strap.

When reference is made above to belts, this must be interpreted broadly, as the attachment means can, of course, be other than belt-type.

Though the device is generally shaped in the manner described, so that the device is narrower at the centre line than at the edges, which is good and permits good comfort in use, changes to the shape are very possible.

All in all, the device according to the invention will strengthen the horse's muscles and thus accelerate its running. The device naturally strengthens the horse's heart and improves its blood circulation, thus promotes the horse's endurance qualities.

The invention claimed is:

1. A device for weight training a trotting-horse of the type that wears a harness, comprising:
   a. a unitary, single piece mat, the mat having a weight between 16 and 50 pounds whereby the mat is 2 to 5 percent of the weight of a trotter horse being trained in use;
   b. the mat having a generally rectangular configuration including:
      i. a V shaped, concave front end, the apex of the V shaped geometry extending rearward,
      ii. a V shaped, concave rear end, the apex of the V shaped geometry extending forwardly, the rear end further having a notch at the apex of the V shaped geometry, and iii. a foldable longitudinal center line dividing the mat into left and right sides;
c. a major cut disposed in each of the left and right sides of the mat, each major cut being disposed so as to generally align with the highest point on a horse's rear scapulae during use, each major cut having a bent geometry wherein an interior first part angles towards the front of the mat and an exterior second part extends laterally towards the exterior edge of the mat, the major cuts forming front and rear parts of each side of the mat, the major cuts further permitting the overlapping of the front and rear parts of each side of the mat during use; and
d. a plurality of minor slits disposed in the mat to render the mat flexible, the minor slits having a crowfoot geometry;
e. a belt to attach the mat to a racing harness.

2. Device according to claim 1, characterized in that it includes a cushioning layer on the side that faces towards the horse's back.

3. Device according to claim 1, characterized in that the mat (1) is manufactured from hard rubber.

4. The device according to claim 1, characterized in that there are slits (9) in the device (1) over essentially its entire area.

\* \* \* \* \*